United States Patent [19]

Katsuyama et al.

[11] 3,882,144

[45] May 6, 1975

[54] 1'-OXOSPIRO(INDOLINE-2,3'-1'H,3H'-2-BENZOXEPINE)DERIVATIVES AND PROCESS FOR THE PREPARATION THEREOF

[75] Inventors: Harumi Katsuyama; Histake Ono, both of Saitama, Japan

[73] Assignee: Fuji Photo Film Co., Ltd., Ashigara-shi, Japan

[22] Filed: Sept. 8, 1972

[21] Appl. No.: 287,385

[30] Foreign Application Priority Data
Sept. 9, 1971  Japan................................ 46-69852

[52] U.S. Cl..... 260/326.11 S; 117/36.2; 260/240 D
[51] Int. Cl............................................. C07d 27/38
[58] Field of Search........................... 260/326.11 IS

[56] References Cited
UNITED STATES PATENTS 3,652,285  3/1972  Detzenne et al........... 260/326.11 X

*Primary Examiner*—Joseph A. Narcavage
*Attorney, Agent, or Firm*—Sughrue, Rothwell, Mion, Zinn & Macpeak

[57] ABSTRACT

A novel 1'-oxospiro(indoline-2,3'-1'-H,3H'-2-benzoxepine) derivative having color-developing characteristics when reacted with an electron-receiving substance, e.g., acidic substance, and useful as a coloring material for a pressure-sensitive copying paper, and a process for preparing the derivative by reacting a 2-methylene indoline derivative or its acid addition product, i.e., 2-methyl quaternary indolenium salt with an o-phthalaldehydic acid derivative in a solvent under neutral or basic conditions are disclosed.

37 Claims, No Drawings

1'-OXOSPIRO(INDOLINE-2,3'-1'H,3H'-2-BENZOX-EPINE)DERIVATIVES AND PROCESS FOR THE PREPARATION THEREOF

FIELD OF THE INVENTION

The present invention relates to a 1'-oxospiro(indoline-2,3'-1'H,3H'-2-benzoxepine) derivative having a novel skeletal structure. In addition, the present invention relates to a process for the preparation of these 1'-oxospiro(indoline-2,3'-1'H,3H'-2-benzoxepine) derivatives by reacting a 2-methylene indoline derivative or an acid addition product precursor, i.e., 2-methyl indolenium salt derivative with an o-phthalaldehydic acid derivative in neutral or basic solution.

SUMMARY OF THE INVENTION

The present invention provides novel 1'-oxospiro-(indoline-2,3'-1'H,3H'-2-benzoxepine) derivatives of the general formulae(I-1), (I-2) and (I-3)

atom, a hydroxyl group, a cyano group, a phenyl group, a carboxyl group, or an alkoxycarbonyl group containing from 2 to 4 carbon atoms and $m$ is an integer of from 1 to 4;

$R_6$ is an alkylene chain containing from 1 to 5 carbon atoms or a xylylene group;

$R_3$ is a hydrogen atom, a halogen atom or a nitro group;

$R_4$ and $R_5$ each is an alkyl group having from 1 to 3 carbon atoms;

Y is an acid radical, and $n$ is 0 or an integer of 1 or 2, and processes as described in detail hereinafter for the preparation of these benzoxepine derivatives of the general formulae (I-1), (I-2) and (I-3).

DETAILED DESCRIPTION OF THE INVENTION

As described above, this invention provides novel 1'-oxospiro(indoline-2,3'-1'H, 3H'-2-benzoxepine) derivatives of the general formulae (I-1), (I-2) and (I-3).

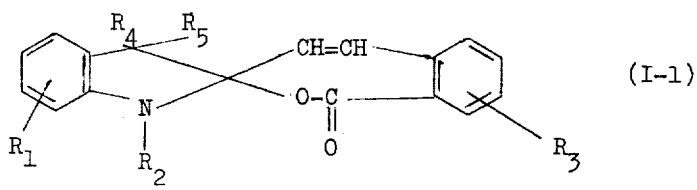

(I-1)

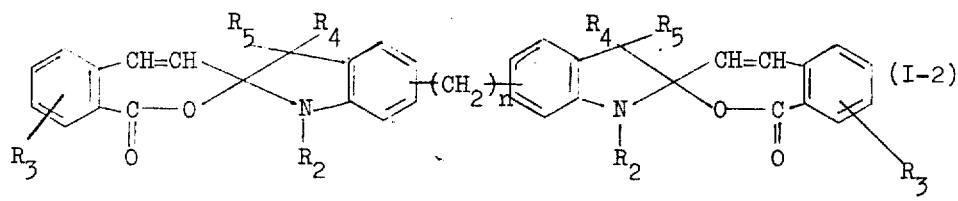

(I-2)

or

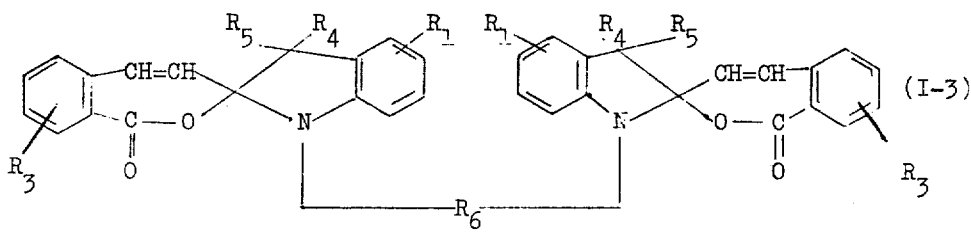

(I-3)

wherein $R_1$ is a hydrogen atom, a halogen atom, a nitro group, an alkyl group containing from 1 to 3 carbon atoms, an alkoxyl group containing from 1 to 3 carbon atoms or an alkoxycarbonyl group containing from 2 to 4 carbon atoms;

$R_2$ is an alkyl group or an aralkyl group represented by the formula $-(CH_2)_m-X$, in which X is a hydrogen The compounds of the general formulae (I-1), (I-2) and (I-3) as described above can be prepared by reacting a 2-methylene indoline derivative of the general formula (II), or a precursor thereof of the general formula (III) with an o-phthalaldehydic acid derivative of the general formula (IV) in a solution under neutral or basic conditions in accordance with the following Reaction Schemes (A), (B), (C), (D), (E) and (F).

Reaction Scheme (A)

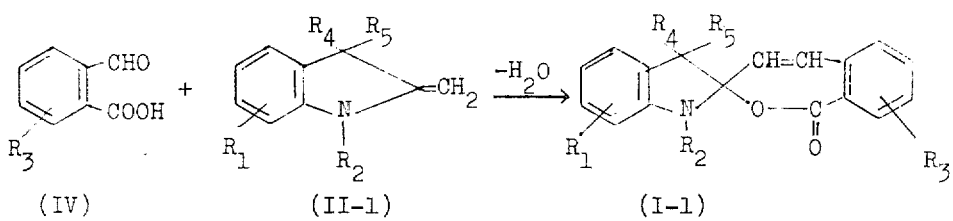

Reaction Scheme (B)

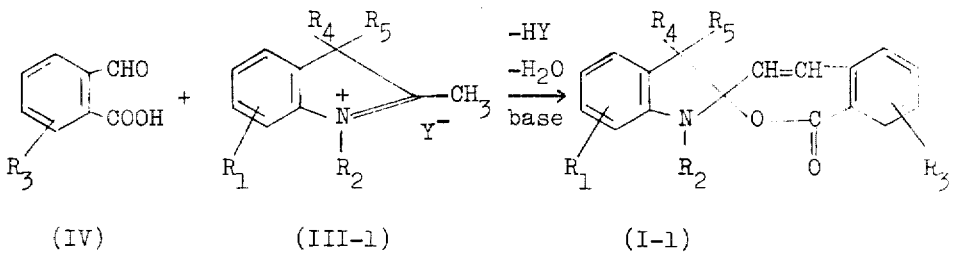

wherein $R_1$ is a hydrogen atom, a halogen atom, a nitro group, an alkyl group containing from 1 to 3 carbon atoms, an alkoxyl group containing from 1 to 3 carbon atoms or an alkoxycarbonyl group containing from 2 to 4 carbon atoms;

$R_2$ is an alkyl group or an aralkyl group represented by the formula $-(CH_2)_m-X$ in which X is a hydrogen atom, a hydroxyl group, a cyano group, a phenyl group, a carboxyl group, or an alkoxycarbonyl group containing from 2 to 4 carbon atoms, and $m$ is an integer of from 1 to 4, inclusive;

$R_3$ is a hydrogen atom, a halogen atom or a nitro group;

$R_4$ and $R_5$ each is an alkyl group containing from 1 to 3 carbon atoms; and

Y is an acid radical.

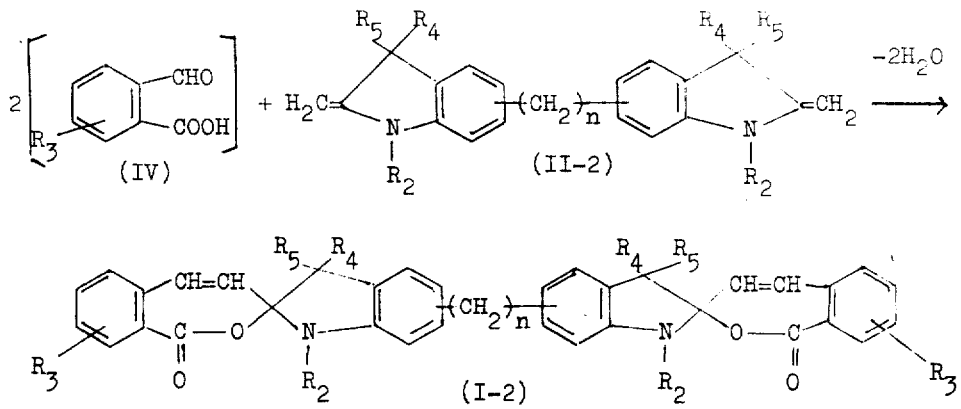

Reaction Scheme (D)

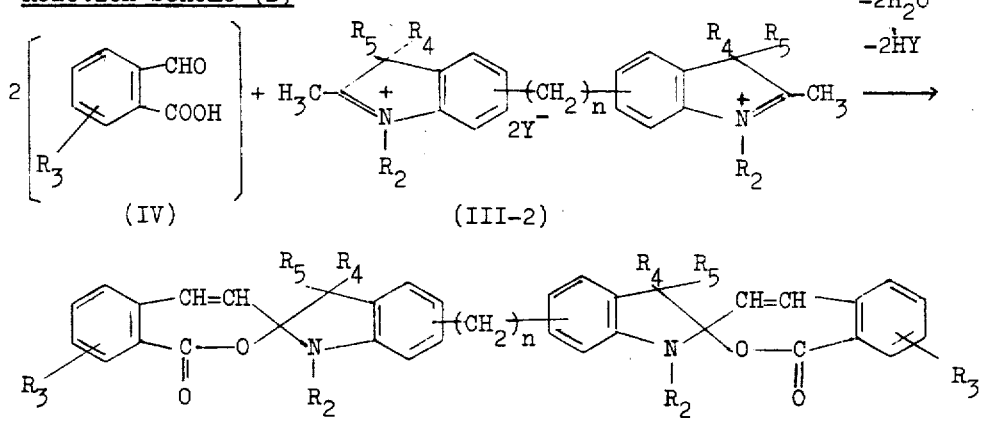

wherein $R_2$ is an alkyl group or an aralkyl group represented by the formula $-(CH_2)_m-X$, in which X is a hydrogen atom, a hydroxy group, a cyano group, a phenyl group, a carboxyl group, or an alkoxycarbonyl group containing from 2 to 4 carbon atoms, m is an integer of from 1 to 4 inclusive;

$R_3$ is a hydrogen atom, a halogen atom or a nitro group;

$R_4$ and $R_5$ each is an alkyl group containing from 1 to 3 carbon atoms;

Y is an acid radical, and n is 0 or an integer of 1 or 2.

$R_4$ and $R_5$ each is an alkyl group containing from 1 to 3 carbon atoms; and

Y is an acid radical.

Examples of methylene indoline to be used in this invention which are represented by the general formulae (II-1), (II-2) and (II-3) are as follows:

2-Methylene-1,3,3,-trimethylindoline, 5-chloro-2-methylene-1,3,3-trimethylindoline, 5-ethoxycarbonyl-2-methylene-1,3,3-trimethylindoline, 2-methylene-5-nitro-1,3,3-trimethylindoline, 1-(γ-cyanopropyl)-3,3-dimethyl-2-methyleneindoline, 3,3-dimethyl-2-methylene-1-(p-nitrobenzyl)indoline, 5,5'-bis(2-

Reaction Scheme (E)

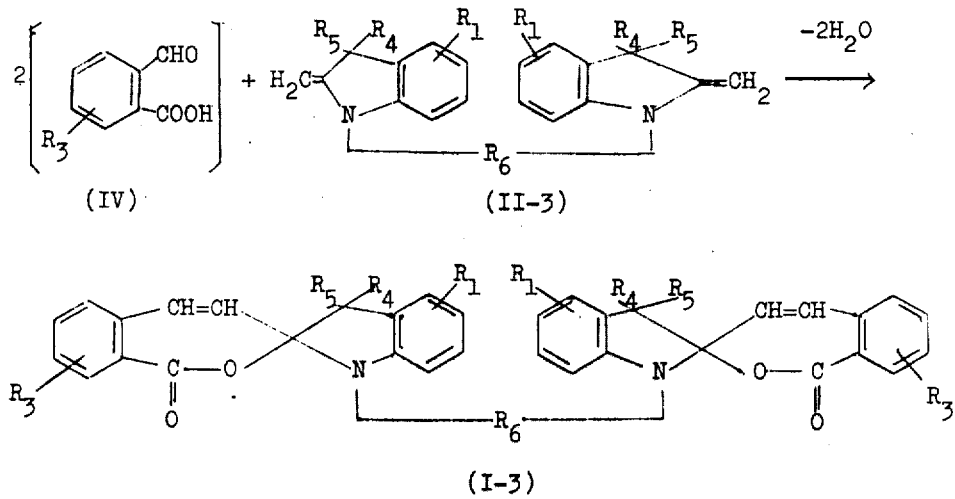

Reaction Scheme (F)

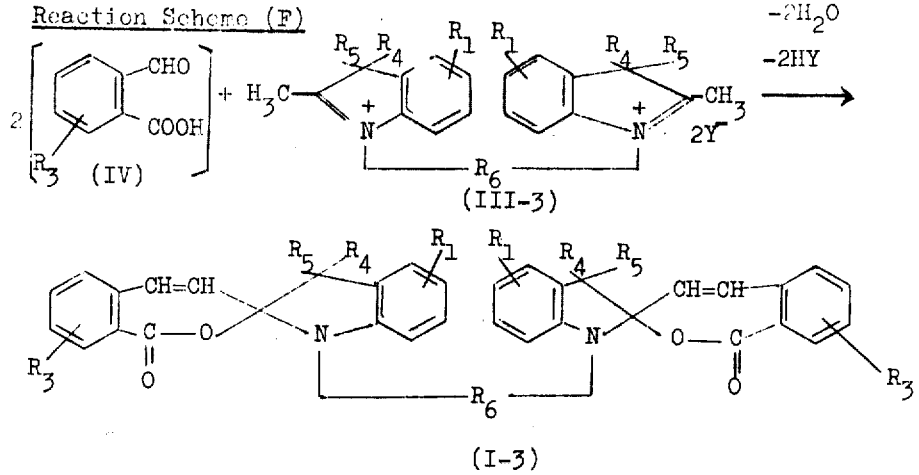

wherein $R_1$ is a hydrogen atom, a halogen atom, a nitro group, an alkyl group containing from 1 to 3 carbon atoms, an alkoxyl group containing from 1 to 3 carbon atoms, or an alkoxycarbonyl group containing from 2 to 4 carbon atoms;

$R_6$ is an alkylene chain containing from 1 to 5 carbon atoms or a xylylene group;

$R_3$ is a hydrogen atom, a halogen atom or a nitro group;

methylene-1,3,3-trimethylindoline), 1,1'-tetramethylenebis(5-chloro-3,3-dimethyl-2-methyleneindoline), 1,1'-methylenebis(3,3-dimethyl-2-methyleneindoline), 1,1'-tetramethylenebis(3,3-dimethyl-2-methyleneindoline), 1,1'-ethylenebis(3,3-dimethyl-2-methyleneindoline), 5,5'-bis(1-γ-cyanopropyl-3,3-dimethyl-2-methyleneindoline), 5,5'-ethylenebis(2-methylene-1,3,3-trimethylindoline), 1,1'-xylylenebis (3,3-dimethyl-2-methyleneindoline), 1,1'-tetramethylenebis-(5-ethoxycarbonyl-2-methylene-1,3,3-trimethylindoline), 1,1'-ethylenebis(5-chloro-2-methylene-1,3,3-trimethylindoline), 5,5'-methylenebis(1-ethyl-3,3-dimethyl-2-methyleneindoline), etc.

The quaternary indolenium salts which are acid addition salts of the methyleneindolines of the general formulae (III–1), (III–2) and (III–3) include, for example, in addition to the acid addition salts of the methyleneindolines listed above, those acid addition salts of other indolines, such as 1-ethyl-2,3,3,5-tetramethylindolenium iodide, 1-ethyl-2,3,3-trimethylindolenium iodide, 1,2,3,3,5-pentamethylindolenium-p-tosylate, 1-ethyl-5-methoxy-2,3,3-trimethylindolenium iodide, 1-(β-hydroxyethyl)- 2,3,3-trimethylindolenium bromide, 1-(β-carboxyethyl)-2,3,3-trimethylindolenium bromide, 1-(β-ethoxycarbonylethyl)-2,3,3-trimethylindolenium bromide, 5,5-methylenebis(1,2,3,3,-tetramethylindolenium-p-tosylate) etc.

The o-phthalaldehydic acid derivatives of the general formula (IV) include, for example, o-phthalaldehydic acid, 5-chloro-o-phthalaldehydic acid, 3-nitro-o-phthalaldehydic acid etc. It is to be noted that the corresponding m- and p- phthalaldehydic acid derivatives cannot be used in the present invention.

The 5-chloro-o-phthalaldehydic acid can be obtained by brominating 6-chlorophthalide at its 3-position with N-bromosuccinimide, then hydrolyzing the resulting product. Also, the substituent $R_3$ in the formula (IV) can easily be arranged by those skilled in the art.

The 3-nitro-o-phthalaldehydic acid can be obtained by nitrating o-phthalaldehydic acid.

The compounds of the general formulae (I–1), (I–2) and (I–3) provided by the present invention are exemplified as follows: 1'-oxo-1,3,3-trimethylspiro(indoline-2,3'-1H,3H-2-benzoxepine), 5-chloro-1'-oxo-1,3,3-trimethylspiro(indoline-2,3'-1'H,3H'-2-benzoxepine), 5-ethoxycarbonyl-1'-oxo-1,3,3-trimethylspiro(indoline-2,3'-1'H,3H'-2-benzoxepine), 5-nitro-1'-oxo-1,3,3-trimethylspiro(indoline-2,3'-1'H,3H'-2-benzoxepine), 1'-oxo-1,3,3,5-tetramethyl-spiro(indoline-2,3'-1'H,3H'-2-benzoxepine), 5-methoxy-1'-oxo-1,3,3-trimethylspiro(indoline-2,3'-1'H,3H'-2-benzoxepine), 5-ethoxy-1'-oxo-1,3,3-trimethylspiro(indoline-2,3'-1'H,3H'-2-benzoxepine), 8'-chloro-1'-oxo-1,3,3-trimethylspiro(indoline-2,3'-1'H,3H'-2-benzoxepine), 1-γ-cyanopropyl-3,3-dimethyl-1'-oxospiro(indoline-2,3'-1'H,3H'-2-benzoxepine),1β-hydroxyethyl-3,3-diethyl-1'-oxospiro(indoline-2,3'-1'H,3H'-2-benzoxepine), 1-β-ethoxycarbonyl-3,3-diethyl-1'-oxospiro(indoline 2,3'-1'H,3H'-2-benzoxepine), 1-β-hydroxycarbonyl-3,3-dimethyl-6'-nitro-1'-oxospiro(indoline-2,3'-1'H,3H'-2-benzoxepine), 1-benzyl-3,3-dimethyl-1'-oxospiro(indoline-2,3'-1'H,3H'-2-benzoxepine), 1-p-nitrobenzyl-3,3-dimethyl-1-oxospiro(indoline-2,3'-1'H,3H'-2-benzoxepine), 1-ethyl-3,3-dimethyl-1'-oxospiro(indoline-2,3'-1'H,3H'-2-benzoxepine), 1-propyl-3,3-dimethyl-1'-oxospiro(indoline-2,3'-1'H,3H'-2-benzoxepine), 1-ethyl-1'-oxo-3,5,5-trimethylspiro(indoline-2,3'-1'H,3H'-2-benzoxepine), 1-ethyl-3,3-dimethyl-5-methoxy-1'-oxospiro(indoline-2,3'-1'H,3H'-2-benzoxepine), 5,5''-bis[1'-oxo-1,3,3-trimethylspiro(indoline-2,3'-1'H,3H'-2-benzoxepine)], 5,5''-bis[1-γ-cyanopropyl-3,3-dimethyl-1'-oxospiro(indoline-2,3'-1'H,3H'-2-benzoxepine)], 5,5''-methylenebis[1'-oxo-1,3,3-trimethyl-spiro(indoline-2,3'-1'H,3H'-2-benzoxepine)], 5,5''-methylenebis[8'-chloro-1'-oxo-1,3,3-trimethylspiro(indoline-2,3'-1'H,3H'-2-benzoxepine)], 5,5''-methylenebis[8'-chloro-1'-oxo-1,3,3-trimethylspiro(indoline-2,3'-1'H,3H'-2-benzoxepine)], 5,5''-ethylenebis[1'-oxo-1,3,3-trimethylspiro(indoline-2,3'-1'H,3H'-2-benzoxepine)], 1,1''-ethylenebis-[1'-oxo-1,3,3-trimethylspiro(indoline-2,3'-1'H,3H'-2-benzoxepine)], 1,1''-ethylenebis[1'-oxo-1,3,3,5-tetramethylspiro(indoline-2,3' -1'H,3H'-2-benzoxepine)], 1,1''ethylenebis[5-chloro-1'-oxo-1,3,3-trimethylspiro(indoline-2,3'-1'H,3H'-2-benzoxepine)], 1,1''-tetramethylenebis[1'-oxo-1,3,3-trimethylspiro(indoline-2,3'-1'H,3H'-2-benzoxepine)], 1,1''-tetramethylenebis[1'-oxo-1,3,3,5-tetramethylspiro(indoline-2,3'-1'H,3H'-2-benzoxepine)], 1,1''-tetramethylenebis[5-ethoxycarbonyl-1'-oxo-1,3,3-trimethyl-spiro(indoline-2,3'-1'H,3H'-2-benzoxepine)], 1,1'''-p-xylylenebis[1'-oxo-1,3,3-trimethylspiro(indoline-2,3'-1'H,3H'-2-benzoxepine)], 1,1'''-m-xylylenebis[1'-oxo-1,3,3-trimethylspiro(indoline-2,3'-1'H,3H'-2-benzoxepine)], etc.

An object of the present invention is to provide 1'-oxospiro(indoline-2,3'-1'H,3H'-2-benzoxepine) derivatives which have a novel skeletal structure and which can be used as color-generating materials for a pressure-sensitive copying paper which develops its color by reacting with an electron-receiving substance and processes for their preparation.

The pressure-sensitive duplicating paper usually contains color-generating material which develops its color upon reacting with an electron-receiving substance, in other words, an acidic substance. The compound of the present invention also is believed to generate color by the extension of the conjugation system caused by the dissociation of the spiro linkage as illustrated in the following reaction scheme (G).

Reaction Scheme (G)

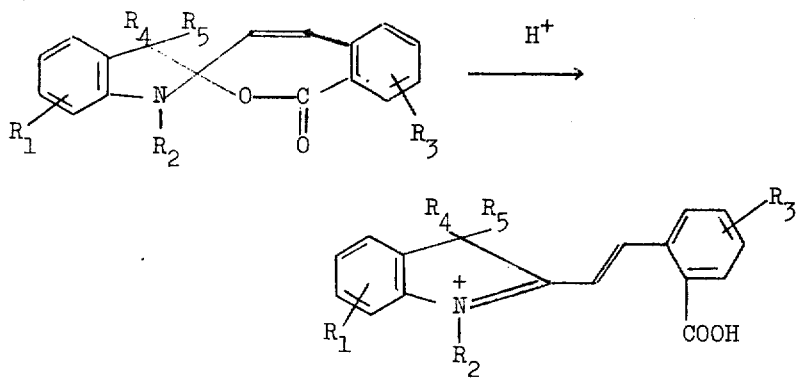

The compound of the present invention, i.e., 1'-oxospiro(indoline-2,3'-1'H,3H'-2-benzoxepines) can be prepared by either reacting o-phthalaldehydic acid with the above-described 2-methylene-indoline derivatives under neutral condition, or with the 2-methylindolenium salts, i.e., the acid addition products of the 2-methylene-indoline derivatives, under basic conditions, as solution thereof in solvents illustrated hereinafter, at a temperature of from 20° to 200°C for the period of from 5 minutes to 10 hours. The reaction is preferably carried out by heating the reaction mixture at from 30° to 100°C for the period of from 10 to 60 minutes.

The concentration of each of the reactants in the solvent can range from 0.1 to 40% by weight, preferably from 1 to 20% by weight.

The molar ratio of the compound (II–1) or (III–1) to the compound (IV) can range from 0.1 to 10 mol %, preferably from 0.5 to 5 mol %, and the molar ratio of the compound (II–2), (II–3), (III–2) or (III–3) to the compound (IV) can range from 0.05 to 5 mol %, preferably from 0.25 to 2.5 mol %.

Suitable solvent which can be used in carrying out the reaction includes alcohols such as methanol, ethanol, etc., ethers such as diethyl ether, dioxane, tetrahydrofuran, 1,2-dimethoxyethane, etc., halogenated paraffinic hydrocarbons such as methylene dichloride, chloroform, carbon tetrachloride, etc., paraffinic hydrocarbons such as n-hexane, cyclohexane, n-heptane, etc., and aromatic hydrocarbons such as benzene, toluene, xylene, etc. These solvents can be used either alone or as a mixture of two or more thereof. The particularly preferred solvent is tetrahydrofuran, methanol or ethanol.

Suitable bases which can be added include triethylamine, tributylamine, piperidine, morpholine, pyridine and the similar amines; sodium hydroxide, potassium hydroxide, sodium acetate and the like alkali metal compounds.

The compounds of the general formulae (II–1) and (III–1) used as starting materials of Reaction Schemes A and B, respectively, can be prepared by the following reaction scheme:

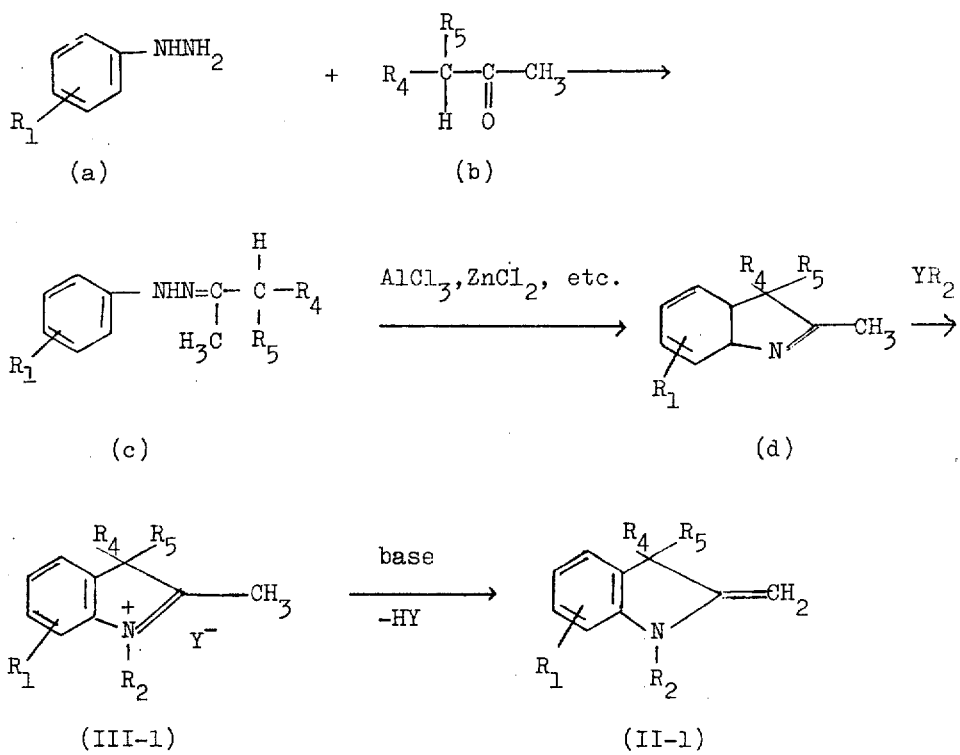

wherein $R_1$, $R_2$, $R_4$, $R_5$ and Y as defined above.

In the above reaction scheme, the substituted phenylhydrazine (a) is reacted with a ketone (b) to give the corresponding phenylhydrazone (c). The resulting phenylhydrazone (c) is then converted into the corresponding indolenine (d) using Lewis acid such as aluminum chloride, zinc chloride, etc. as a catalyst according to the Fischer's Indole Synthesis Method described in W. C. Sumpter & F, M. Miller, *Heterocyclic Compounds with Indole and Carbazole System*, (1954), pages 3-23, published by Interscience Publishing Inc. The indolenine (d) obtained above can then be quaternarized with an alkylating agent to give the desired indolenium salt (III-1). The indolenium (III-1) can be treated with a base to obtain the desired indoline (II-1).

The compounds of the general formulae (III-3) and (II-3) used as starting materials of Reaction Schemes F and E, respectively, can be prepared by the following reaction scheme:

Next, the description will be made hereinafter with regard to the chemical structure of the compound of the present invention, i.e., 1'oxospiro(indoline-2,3'-1'H,3H'-2-benzoxepine) derivatives. Since this group of compounds is literally unknown, the structure thereof has been determined according to the results of measurements using various instrumental analyses involving elementary analysis, the infrared absorption spectrum, the ultraviolet visible light absorption spectrum, and the nuclear magnetic resonance spectrum (NMR).

The analytical determination of the structure of the compound (1), taking the product prepared from 2-methylene- 1,3,3-trimethylene indoline and o-phthalaldehydic acid as an example, will be discussed in detail hereinbelow. This compound is a colorless crystal melting at 189°-190°C and confirmed, as a result of an elementary analysis, to be a dehydrated con-

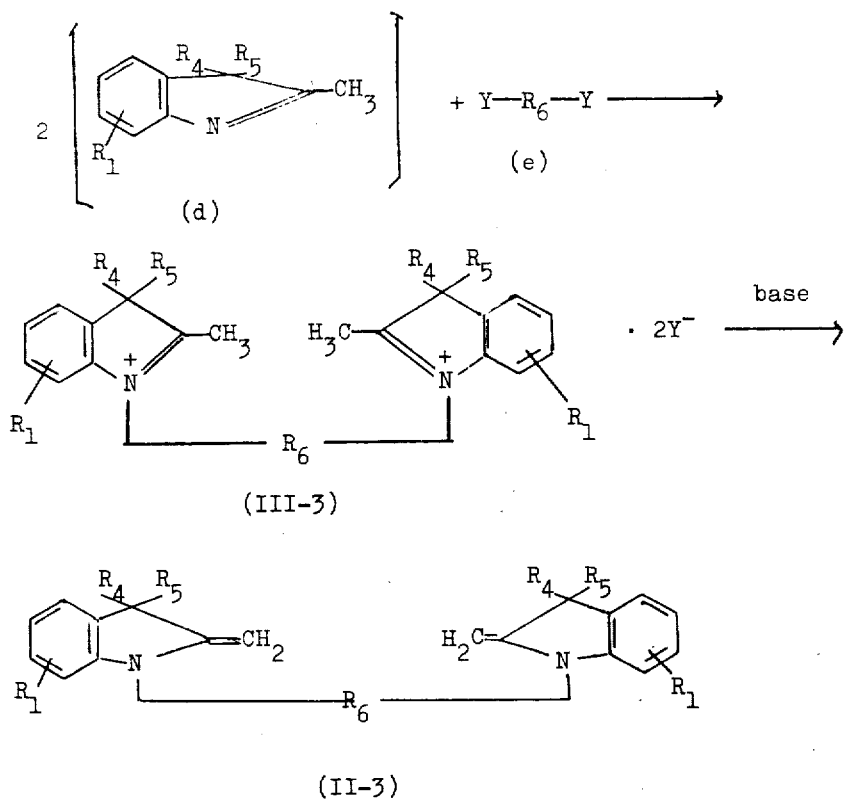

wherein $R_1$, $R_4$, $R_5$, $R_6$ and Y are as defined above.

In the above reaction scheme, the bis-indolenium salt (III-3) can be obtained from the indolenine (d) by using a bis-functional alkylating agent represented by the formula (e) in the quaternarization. The resulting bis-indolenium salt (III-3) can then be treated with a base to obtain the desired dimerized indoline (II-3).

The compounds of the general formulae (II-2) and (III-2) used as starting materials of Reaction Schemes C and D, respectively, can be prepared in the same manner as that described for the preparation of (III-3) and (II-3) from a bis-hydrazine corresponding to the starting material for the Fischer's Indole Synthesis Method described above.

densation product having the following elementary composition:

Elementary Analysis

|   | Calculated (%) | Found (%) |
|---|---|---|
| C | 78.66 | 78.88 |
| H | 6.27  | 6.12  |
| N | 4.59  | 4.56  |

Moreover, the compound (1) exhibits in its infrared absorption spectrum, absorptions at 1738, 1060cm$^{-1}$, which the value coincides with that of lactones, and indicates absorption of carbon-carbon double bonds at 1635cm$^{-1}$. In the ultraviolet visible absorption spectrum, the maximum absorption appears only at 290mμ in a chloroform solution, but another maximum absorption appears at 390mμ when a very small amount of $CO_2$ is passed through the solution.

Moreover, the measurement with the NMR spectrum in Hexadeuterobenzene solution using tetramethyl silane as internal standard indicated the presence of adjacent methyl groups at the 3-position of indoline at 1.42 ppm and 1.52 ppm as a non-equivalent single line, and an N-methyl group at 2.43 ppm together with a vinyl hydrogen at the 4,5-position of the oxepine at 3.97 ppm and 6.26 ppm with a coupling constant of 11.0 Hz were also found.

The results of these various spectra demonstrates that the structure of the compound (1) of the present invention is represented by the previously described 1'-oxo-1,3,3-trimethylspiro(indoline-2,3'-1'H,3H'-2-benzoxepine).

The process of the present invention will be further explained in greater detail by reference to the following examples. Unless otherwise indicated all parts and percents are by weight.

EXAMPLE 1

To 30 ml of ethanol were dissolved 1.73 g of 2-methylene-1,3,3-trimethylindoline and 1.50 g. of o-phthalaldehydic acid and the resulting solution was heated under reflux. After 10 minutes, the precipitation of crystals was observed and the reaction terminated after 1 hour. After the resulting solution was allowed to cool, the crystals precipitated were recovered by filtration and recrystallized from an ethanol-acetone mixture to give 2.85 g. of colorless crystals, the composition of which coincides with the compound (1), i.e., 1'-oxo-1,3,3-trimethylspiro(indoline-2,3'-1'H-3H'-2-benzoxepine), having the abovedescribed physical properties, in a yield of 93%.

Similarly, various methylene indolines were reacted with o-phthalaldehydic acid derivatives under similar reaction conditions to give spiro(indoline-2,3'-1'H,3H'-2-benzoxepine) (I-1), i.e., compounds (2)-(7) in high yields respectively. The results obtained are given in Table 1.

EXAMPLE 2

Into 30 ml of ethanol were dissolved 3.47 g. of 1-ethyl-2,3,3-trimethylindolenium iodide and 1.50 g of o-phthalaldehydic acid, and the resulting solution was refluxed together with 1.5 g of triethylamine. After 1 hour, the reaction product was allowed to cool and then the crystals separated were recovered by filtration followed by recrystallization from ethanol-acetone to give 3.0 g. of colorless granular crystals of 3,3-dimethyl-1-ethyl-1'-oxospiro(indoline-2,3'-1'H,3H'-2-benzoxepine), compound (8) in a yield of 92%. The melting point of this compound (8) was 192°–193°C.

| Elementary Analysis | | |
|---|---|---|
| | Calculated (%) | Found (%) |
| C | 78.97 | 78.89 |
| H | 6.63 | 6.58 |
| N | 4.39 | 4.32 |

According to the infrared absorption spectrum, the stretching vibration of the lactone was 1745cm$^{-1}$.

Next, various indolenium salts and o-phthalaldehydic acid derivatives were reacted under similar conditions to give spiro(indoline-2,3'-1'H,3H'-2-benzoxepine) in high yields. The results obtained are given in Table 2.

Table 1

| Compound No. | Substituents | | | | | Melting Point (°C) | Yield (%) |
|---|---|---|---|---|---|---|---|
| | $R_1$ | $R_2$ | $R_3$ | $R_4$ | $R_5$ | | |
| 2 | -5-Cl | -CH$_3$ | -H | -CH$_3$ | -CH$_3$ | 194-195 | 88 |
| 3 | -5-OCOC$_2$H$_5$ | -CH$_3$ | -H | -CH$_3$ | -CH$_3$ | 195-196 | 88 |
| 4 | -5-NO$_2$ | -CH$_3$ | -H | -CH$_3$ | -CH$_3$ | 254-255 | 64 |
| 5 | -H | -CH$_3$ | -8'-Cl | -CH$_3$ | -CH$_3$ | 180-182 | 85 |
| 6 | -H | -(CH$_2$)$_3$CN | -H | -CH$_3$ | -CH$_3$ | 125-126 | 66 |
| 7 | -H | -CH$_2$-C$_6$H$_4$-NO$_2$ | -H | -CH$_3$ | -CH$_3$ | 153-155 | 77 |

Table 2

| Compound No. | Substituent Groups | | | | | Melting Point (°C) | Yield (%) |
|---|---|---|---|---|---|---|---|
| | $R_1$ | $R_2$ | $R_3$ | $R_4$ | $R_5$ | | |
| 9 | -5-CH$_3$ | -C$_2$H$_5$ | -H | -CH$_3$ | -CH$_3$ | 109-110 | 45 |
| 10 | -5-OCH$_3$ | -C$_2$H$_5$ | -H | -CH$_3$ | -CH$_3$ | 183-184 | 72 |

Table 2 —Continued

| 11 | -H | -(CH$_2$)$_2$OH | -H | -CH$_3$ | -CH$_3$ | 189-190 | 58 |
| 12 | -H | -(CH$_2$)$_2$COOH | -6'-NO$_2$ | -CH$_3$ | -CH$_3$ | 195-196 | 43 |
| 13 | -H | -(CH$_2$)$_2$COO-⟨phenyl⟩ | -H | -CH$_3$ | -CH$_3$ | 154-155 | 52 |

EXAMPLE 3

In 60 ml of methanol, 3.44 g of 5,5'-bis(2-methylene-1,3,3-trimethylindoline) and 3.00 g of o-phthalaldehydic acid were reacted in a manner similar to that employed in Example 1 to give 5.40 g (yield=88%) of crystalline 5,5''-bis[1'-oxo-1,3,3-trimethylspiro(indoline-2,3'-1'H,3H'-2-benzoxepine)], compound (14), which was thereafter recrystallized from ethyl alcohol-tetrahydrofuran to give colorless crystals melting at 260°–262°C.

Elementary Analysis

|   | Calculated (%) | Found (%) |
|---|---|---|
| C | 78.92 | 78.95 |
| H | 5.96 | 5.95 |
| N | 4.61 | 4.72 |

The value of the stretching vibration of the lactone measured by infrared absorption spectrum was 1743cm$^{-1}$.

According to the infrared absorption spectrum, the stretching vibration of the lactone was 1740 cm$^{-1}$.

EXAMPLE 5

In 30 ml of ethanol there were reacted 1.9 g of 1,1'-tetramethylenebis(3,3-dimethyl-2-methyleneindoline) with 1.5 g of o-phthalaldehydic acid in a similar manner to that described in Example 1 to give 3.2 g(yield=98%) of 1,1'''-tetramethylenebis-[3,3-dimethyl-1'-oxospiro(indoline-2,3'-1'H,3H'-2-benzoxepine)], compound (16), as crystals which were thereafter recrystallized from ethyl alcohol-tetrahydrofuran to give colorless crystals melting at 236°–237°C.

The value of the stretching vibration in the infrared absorption spectrum was 1745 cm$^{-1}$.

Under the same reaction conditions, indolines dimerized at the nitrogen atom were reacted with o-phthalaldehydic acid to give bisspiro(indoline-2,3'-1'H,3H'-2-benzoxepine) (I-3) in a good yield. The results obtained are given in Table 3.

Table 3

| Compound No. | R$_1$ | R$_6$ | R$_3$ | R$_4$ | R$_5$ | Melting Point (°C) | Yield (%) |
|---|---|---|---|---|---|---|---|
| 17 | -H | -(CH$_2$)$_2$- | -H | -CH$_3$ | -CH$_3$ | 215-217 | 90 |
| 18 | -H | -CH$_2$-⟨phenyl⟩-CH$_2$- | -H | -CH$_3$ | -CH$_3$ | 250-252 | 96 |

EXAMPLE 4

A mixture of 6.92 g of 5,5-methylenebis(1,2,3,3-tetramethyl indolenium p-tosylate) and 3.00 g of o-phthalaldehydic acid was heated under reflux for 1 hour in tetrahydrofuran in the presence of 2.5 g of triethanolamine. After cooling the reaction liquid, the precipitated salt was separated by filtration and the filtrate liquid was condensed using vacuum distillation to thereby form crystals which were thereafter recrystallized from ethyl alcohol-tetrahydrofuran to give 4.6 g (yield=75%) of 5,5''-methylenebis[1'-oxo-1,3,3-trimethylspiro(indoline-2,3'-1'H,3H'-2-benzoxepine)], compound (15), having a melting point of 235°–236°C.

Elementary Analysis

|   | Calculated (%) | Found (%) |
|---|---|---|
| C | 79.07 | 79.05 |
| H | 6.15 | 6.21 |
| N | 10.28 | 10.27 |

While the invention has been described in detail and in terms of specific embodiments thereof it will be apparent to one skilled in the art that various changes and modifications can be made therein without departing from the spirit and scope thereof.

What is claimed is:

1. A 1'-oxospiro(indoline-2,3'-1'H,3H'-2-benzoxepine) compound of the formula:

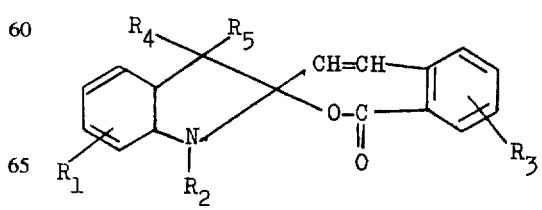

(I - 1)

—Continued

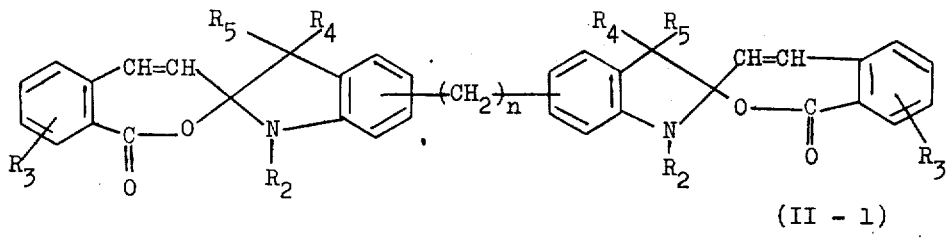

(II - 1)

or

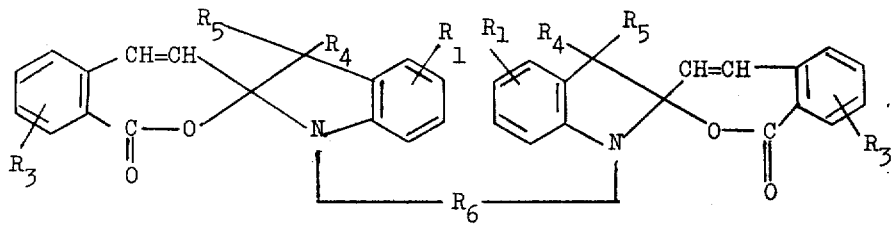

(III - 1)

wherein $R_1$ is a hydrogen atom, a halogen atom, a nitro group, an alkyl group containing from 1 to 3 carbon atoms, an alkoxyl group containing from 1 to 3 carbon atoms, or an alkoxycarbonyl group containing from 2 to 4 carbon atoms;

$R_2$ is an alkyl group or an aralkyl group represented by the formula $-(CH_2)_m-X$, in which X is a hydrogen atom, a hydroxyl group, a cyano group, a nitro phenyl group, a carboxyl group, or an alkoxycarbonyl group containing from 2 to 4 carbon atoms and $m$ is an integer of from 1 to 4;

$R_6$ is an alkylene chain containing from 1 to 5 carbon atoms or a xylylene group;

$R_3$ is a hydrogen atom, a halogen atom or a nitro group;

$R_4$ and $R_5$ each is an alkyl group having from 1 to 3 carbon atoms; and $n$ is 0 or an integer of 1 or 2.

2. The compound of claim 1, wherein said compound is oxo-1,3,3-trimethylspiro(indoline-2,3'-1'H,3H'-2-benzoxepine).

3. The compound of claim 1, wherein said compound is 1,3,3,-trimethylspiro(indoline-2,3'-1'H,3H'-2-benzoxepine).

4. The compound of claim 1, wherein said compound is 5-ethoxycarbonyl-1'-oxo-1,3,3-trimethylspiro(indoline-2,3'-1'H,3H'-2-benzoxepine).

5. The compound of claim 1, wherein said compound is 5-nitro-1'-oxo-1,3,3-trimethylspiro(indoline-2,3'-1'H,3H'-2-benzoxepine).

6. The compound of claim 1, wherein said compound is 8'-chloro-1'-oxo-1,3,3-trimethylspiro(indoline-2,3'-1'H,3H'-2-benzoxepine).

7. The compound of claim 1, wherein said compound is 3,3-dimethyl-1-(γ-cyanopropyl)-1'-oxospiro(indoline-2,3'-1'H,3H'-2-benzoxepine).

8. The compound of claim 1, wherein said compound is 3,3-dimethyl-1-(p-nitrobenzyl)-1'-oxospiro(indoline-2,3'-1'H,3H'-2-benzoxepine).

9. The compound of claim 1, wherein said compound is 3,3-dimethyl-1-ethyl-1'-oxospiro(indoline-2,3'-1'H,3H'-2-benzoxepine).

10. The compound of claim 1, wherein said compound is 1-ethyl-1'-oxo-3,3,5-trimethylspiro(indoline-2,3'-1'H,3H'-2-benzoxepine).

11. The compound of claim 1, wherein said compound is 3,3-dimethyl-1-ethyl-5-methoxy-1'-oxospiro(indoline-2,3'-1'H,3H'-2-benzoxepine).

12. The compound of claim 1, wherein said compound is 3,3-dimethyl-1-(β-hydroxyethyl)-1'-oxospiro(indoline-2,3'-1'H,3H'-2-benzoxepine).

13. The compound of claim 1, wherein said compound is 3,3-dimethyl-1-(β-carboxyethyl)-6'-nitro-1'-oxospiro(indoline-2,3'-1'H,3H'-2-benzoxepine).

14. The compound of claim 1, wherein said compound is 3,3-dimethyl-(β-carbethoxyethyl)-1'-oxospiro(indoline-2,3'-1'H,3H'-2-benzoxepine).

15. The compound of claim 1, wherein said compound is 5,5''-bis(1-oxo-1,3,3-trimethylspiro(indoline-2,3'-1'H,3H'-2-benzoxepine)].

16. The compound of claim 1, wherein said compound is 5,5''-methylenebis-[1'-oxo-1,3,3-trimethylspiro(indoline-2,3'-1'H,3H'-2-benzoxepine)].

17. The compound of claim 1, wherein said compound is 1,1'''-tetramethylene-bis[3,3-dimethyl-1'-oxospiro(indoline-2,3'-1'H,3H'-2-benzoxepine)].

18. The compound of claim 1, wherein said compound is 1,1'''-ethylenebis[3,3-dimethyl-1'-oxospiro(indoline-2,3'-1'H,3H'-2-benzoxepine)].

19. The compound of claim 1, wherein said compound is 1,1'''-xylylenebis[3,3-dimethyl-1'-oxospiro(indoline-2,3'-1'H,3H'-2-benzoxepine)].

20. A process for the preparation of a 1'-oxospiro(indoline-2,3'-1'H,3H'-2-benzoxepine) derivative represented by the general formula:

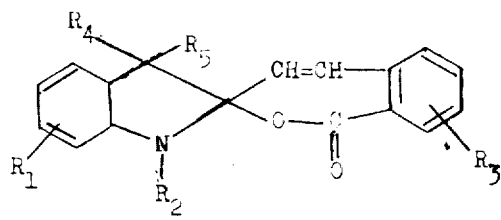

of claim 1, which comprises reacting a 2-methyleneindoline derivative of the general formula:

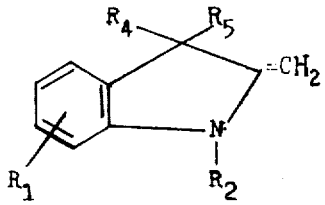

or a 2-methylindolenium salt derivative of the general formula:

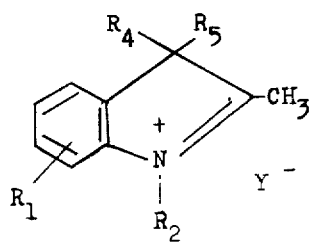

with o-phthalaldehydic acid derivative of the general formula:

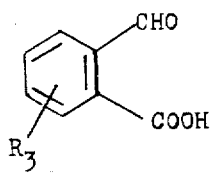

wherein $R_1$, $R_2$, $R_3$, $R_4$, $R_5$ and Y are defined in claim 1, in a solvent selected from the group consisting of alcohols, ethers, halogenated paraffinic hydrocarbons, paraffinic hydrocarbons, aromatic hydrocarbons and mixtures thereof, the reaction being conducted under neutral conditions for said 2-methyleneindoline derivative of the general formula:

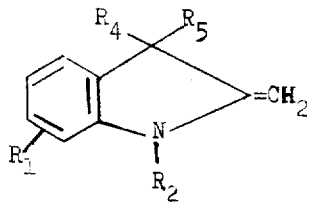

and under basic conditions for said 2-methylindolenium salt derivative of the general formula:

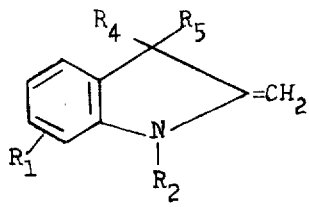

with said reaction being conducted at a temperature of from 20° to 200°C for a period of from 5 minutes to 10 hours, the molar ratio of said 2-methyleneindoline derivative or said 2-methylidolenium salt derivative to said o-phthaladehydic acid derivative ranging from 0.1 to 10 mol%, the concentration of each of the reactants in said solvent ranging from 0.1 to 40% by weight, and said basic conditions comprise conducting the process in the presence of at least one base selected from the group consisting of amines, alkali metal hydioxides, and basic metal salts.

21. A process for the preparation of a 1'-oxospiro(indoline-2,3'-1'H,3H'-2-benzoxepine) derivative represented by the general formula:

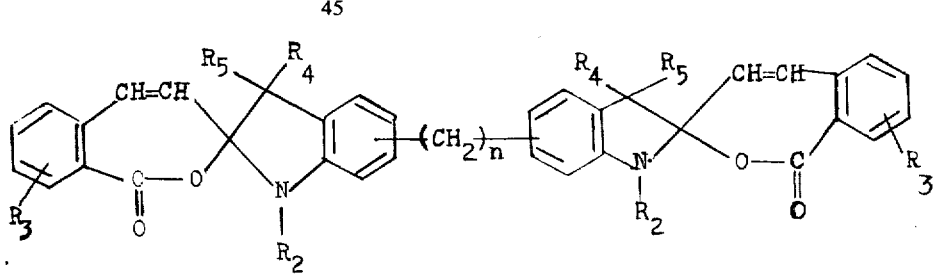

of claim 1, which comprises reacting a dimerized 2-methyleneindoline derivative of the general formula:

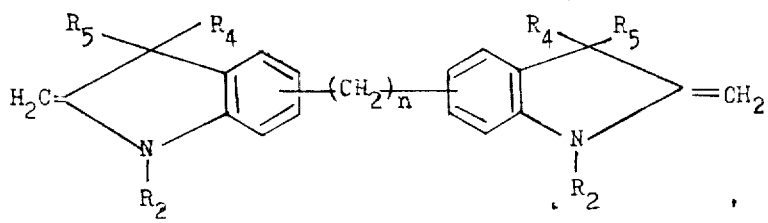

or a dimerized 2-methylindolenium salt derivative of the general formula:

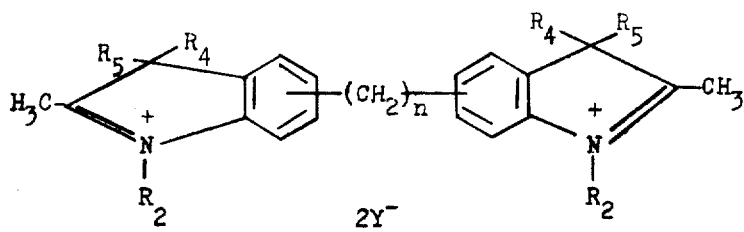

with a o-phthalaldehydic derivative of the general formula:

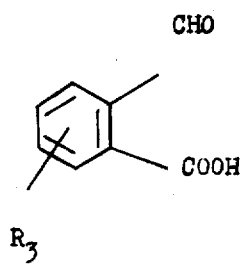

wherein $R_2$, $R_3$, $R_4$, $R_5$, Y and $n$ are as defined in claim 1, in a solvent selected from the group consisting of alcohols, ethers, halogenated paraffinic hydrocarbons, paraffinic hydrocarbons, aromatic hydrocarbons and mixtures thereof, the reaction being conducted under neutral conditions for said dimerized methyleneindoline derivative of the general formual:

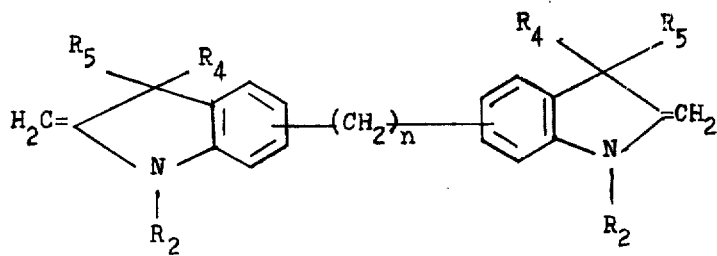

and under basic conditions for said dimerized methyleneindoline derivative of the general formula:

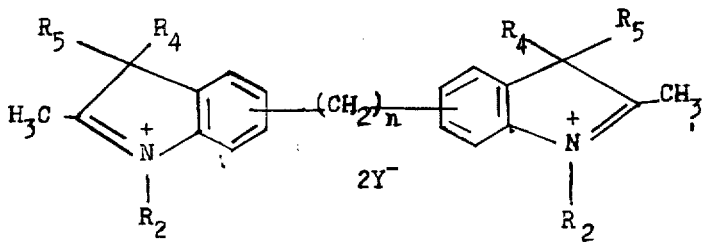

with said reaction being conducted at a temperature of from 20° to 200°C for a period of from 5 minutes to 10 hours, the molar ratio of said dimerized 2-methyleneindoline derivative or said dimerized 2-methyleneindolineum salt derivative to said o-phthaladehydic acid derivative ranging from 0.05 to 5 mol%, the concentration of each of the reactants in said solvent ranging from 0.1 to 40% by weight, and said basic conditions comprise conducting the process in the presence of at least one base selected from the group consisting of amines, alkali metal hydroxides, and basic metal salts.

22. A process for the preparation of a 1'-oxospiro(indoline-2,3'-1'H,3H'-2-benzoxepine) derivative represented by the following general formula:

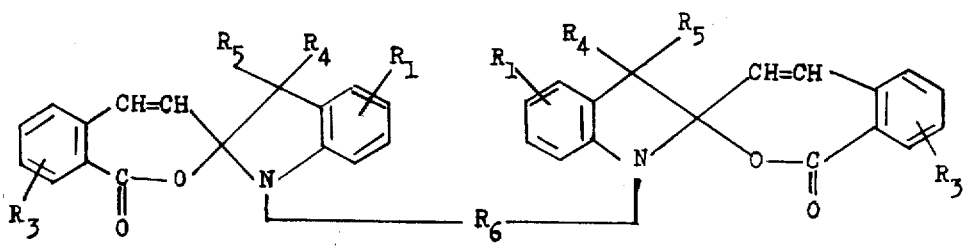

of claim 1, which comprises reacting a dimerized 2-methyleneindoline derivative of the general formula:

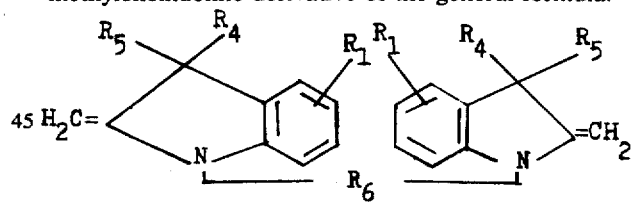

or a dimerized 2-methylindolenium salt derivative of the general formula:

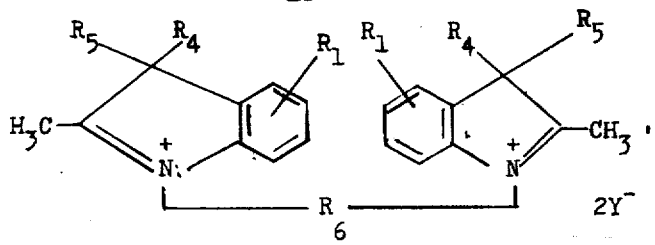

with a o-phthalaldehydic acid derivative of the general formula:

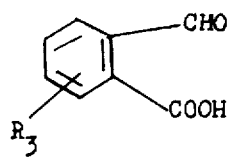

wherein $R_1$, $R_2$, $R_3$, $R_4$, $R_5$ and Y are as defined in claim 1 in a solvent selected from the group consisting of alcohols, ethers, halogenated paraffinic hydrocarbons, paraffinic hydrocarbons, aromatic hydrocarbons and mixtures thereof, the reaction being conducted under neutral conditions for said dimerized 2-methyleneindoline derivative of the general formula:

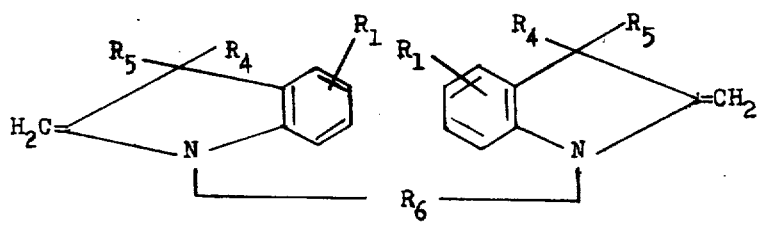

and under basic conditions for said dimerized 2-methylindolenium salt, derivative of the general formula:

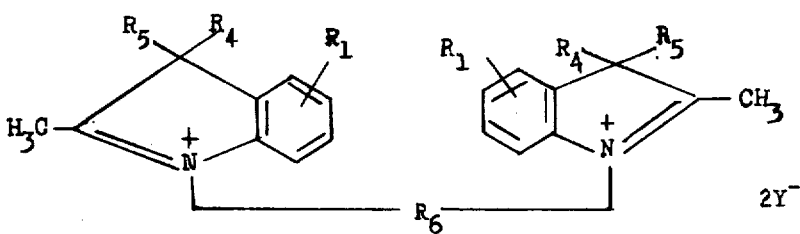

with said reaction being conducted at a temperature of from 20 to 200°C for a period of from 5 minutes to 10 hours, the molar ratio of said dimerized 2-methyleneindoline derivative or said dimerized 2-methyleneindolineum salt derivative to said O-phthaladehydic acid derivative ranging from 0.05 to 5 mol%, the concentration of each of the reactants in said solvent ranging from 0.1 to 40% by weight, and said basic conditions comprise conducting the process in the presence of at least one base selected from the group consisting of amines, alkali metal hydroxides, and basic metal salts.

23. The process of claim 20, wherein said 1'-oxospiro(indoline-2,3',1'H,3H'-2-benzoxepine) derivative is:

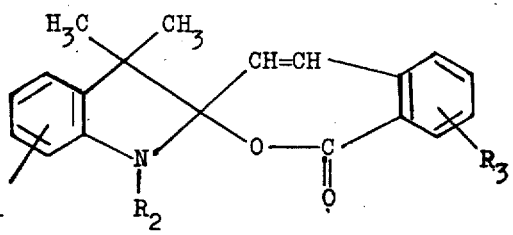

24. The process of claim 21, wherein said 1'-oxospiro(indoline-2,3'-1'H,3H'-2-benzoxepine) derivative is:

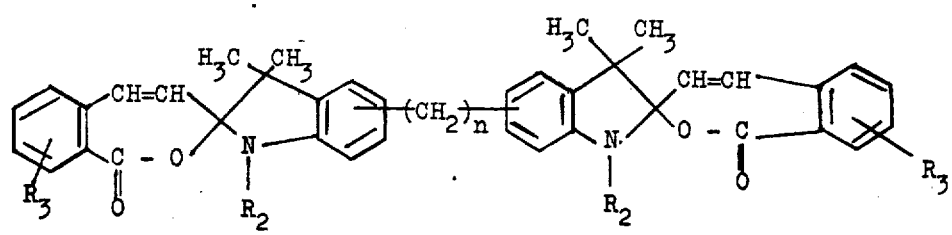

25. The process of claim 22, wherein said 1'-oxospiro(indoline-2,3'-1'H,3H'-2-benzoxepine) derivative is:

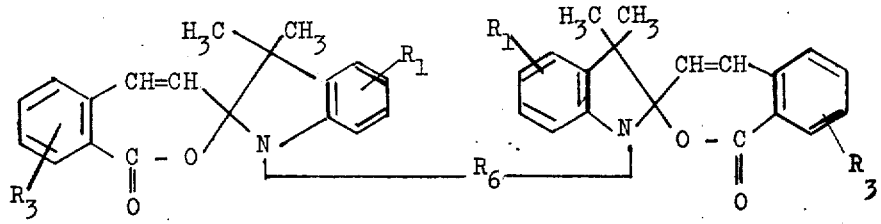

26. The process of claim 20, wherein said 2-methyleneindoline derivative has the general formula:

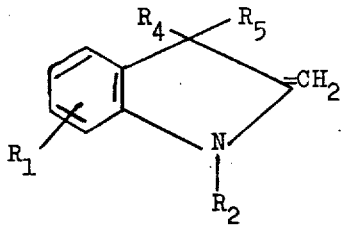

27. The process of claim 20, wherein said 2-methylindolenium salt derivative has the general formula:

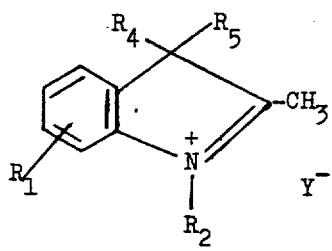

28. The process of claim 21, wherein said dimerized 2-methyleneindoline derivative has the general formula:

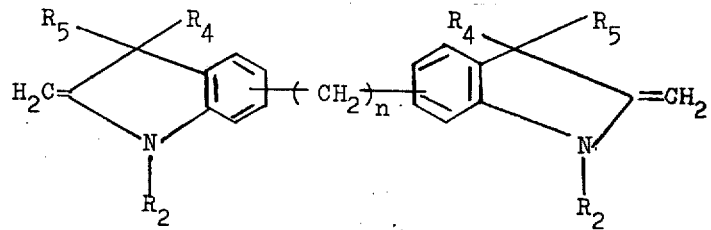

29. The process of claim 21, wherein said dimerized 2-methylindolenium salt derivative has the general formula:

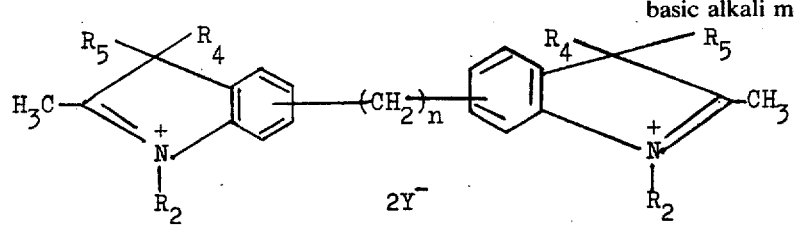

30. The process of claim 22, wherein said dimerized 2-methylene derivative has the general formula:

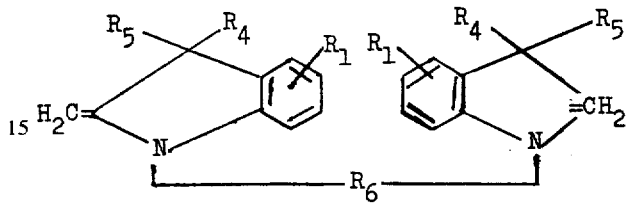

31. The process of claim 22, wherein said dimerized 2-methylene derivative has the general formula:

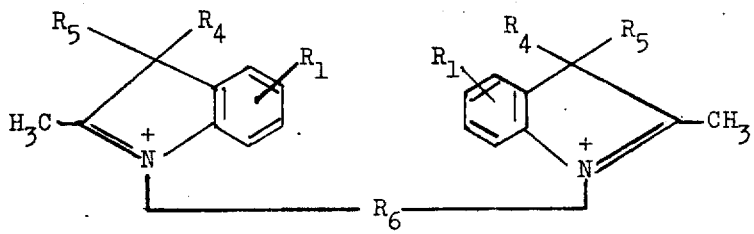

32. The process of claim 20, wherein said amine is selected from the group consisting of triethylamine, tributylamine, piperidine, morpholine and pyridine.

33. The process of claim 21, wherein said amine is selected from the group consisting of triethylamine, tributylamine, piperidine, morpholine and pyridine.

34. The process of claim 22, wherein said amine is selected from the group consisting of triethylamine, tributylamine, piperidine, morpholine and pyridine.

35. The process of claim 20, wherein said alkali metal hydroxide is selected from the group consisting of sodium hydroxide, potassium hydroxide and wherein said basic alkali metal salt is sodium acetate.

36. The process of claim 21, wherein said alkali metal hydroxide is selected from the group consisting of sodium hydroxide, potassium hydroxide and wherein said basic alkali metal salt is sodium acetate.

37. The process of claim 22, wherein said alkali metal hydroxide is selected from the group consisting of sodium hydroxide, potassium hydroxide and wherein said basic alkali metal salt is sodium acetate.

* * * * *